United States Patent
Sakaue et al.

(10) Patent No.: US 7,169,533 B2
(45) Date of Patent: Jan. 30, 2007

(54) OPTICAL INFORMATION RECORDING MEDIUM, METHOD FOR MANUFACTURING THE SAME AND RECORDING/REPRODUCTION METHOD

(75) Inventors: Yoshitaka Sakaue, Hirakata (JP); Ken'ichi Nagata, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 339 days.

(21) Appl. No.: 10/101,430

(22) Filed: Mar. 18, 2002

(65) Prior Publication Data

US 2002/0168587 A1   Nov. 14, 2002

(30) Foreign Application Priority Data

Mar. 19, 2001  (JP)  ............... 2001-077854

(51) Int. Cl.
*G11B 7/24* (2006.01)

(52) U.S. Cl. ............. 430/270.13; 430/945; 428/645; 369/275.2; 369/275.5

(58) Field of Classification Search ........... 430/290.13, 430/945, 279.13; 428/64.5; 369/64.4, 275.2, 369/275.5
See application file for complete search history.

(56) References Cited

U.S. PATENT DOCUMENTS

| | | | |
|---|---|---|---|
| 4,670,345 A | 6/1987 | Morimoto et al. | 430/945 |
| 5,187,052 A | 2/1993 | Maeda et al. | 430/19 |
| 5,191,565 A | 3/1993 | Inoue et al. | |
| 5,368,986 A * | 11/1994 | Terao et al. | 430/270.12 |
| 5,395,669 A * | 3/1995 | Kawahara et al. | 428/64.6 |
| 5,560,998 A * | 10/1996 | Oyamatsu et al. | 428/694 ML |
| 5,688,574 A | 11/1997 | Tamura et al. | 430/270.13 |
| 5,709,978 A | 1/1998 | Hirotsune et al. | 430/270.13 |

(Continued)

FOREIGN PATENT DOCUMENTS

EP   335 469   10/1989

(Continued)

OTHER PUBLICATIONS

Translation of JP 2002-150609, partial.

(Continued)

*Primary Examiner*—Martin Angebranndt
(74) *Attorney, Agent, or Firm*—Hamre, Schumann, Mueller & Larson, P.C.

(57) ABSTRACT

A disk with an Ag reflective layer, a recording layer including elements Sb and Te, and a dielectric layer including S provided between the reflective layer and the recording layer has the problems of corrosion of the Ag reflective layer, decline of the signal quality due to insufficient heat releasing ability, and exfoliation between the layers. (1) A phase-change optical disk includes, on a transparent substrate, a recording layer in which an optically detectable reversible change between an amorphous phase and a crystalline phase can be caused by irradiation with an energy beam, a reflective layer, and a dielectric layer arranged between the recording layer and the reflective layer, wherein the main component of the dielectric layer is an oxide or a nitrooxide of Ta. (2) Between the recording layer and the dielectric layer, a layer including a nitride, an oxide, a carbide or nitrooxide of an element α (wherein α is at least one element selected from Sn, In, Zr, Si, Cr, Al, V, Nb, Mo, W, Ti, Mg and Ge) is provided.

15 Claims, 5 Drawing Sheets

U.S. PATENT DOCUMENTS

| | | | |
|---|---|---|---|
| 5,750,293 A * | 5/1998 | Abe ............................. 430/21 |
| 5,753,413 A | 5/1998 | Nishida et al. ......... 430/270.13 |
| 5,853,872 A * | 12/1998 | Shimamori et al. ......... 428/332 |
| 5,914,214 A | 6/1999 | Ohta et al. ............. 430/270.13 |
| 6,040,030 A | 3/2000 | Utsunomiya et al. .. 430/270.13 |
| 6,096,399 A | 8/2000 | Yoshinari et al. ...... 430/270.13 |
| 6,153,063 A | 11/2000 | Yamada et al. .......... 369/275.5 |
| 6,177,166 B1 * | 1/2001 | Ohno et al. ................. 428/64.1 |
| 6,312,779 B1 * | 11/2001 | Hirotsune et al. ......... 428/64.1 |
| 6,312,780 B1 * | 11/2001 | Kasami et al. ............. 428/64.1 |
| 6,406,771 B1 * | 6/2002 | Nakakuki et al. .......... 428/64.1 |
| 6,596,366 B2 * | 7/2003 | Ohno ......................... 428/64.1 |
| 6,670,014 B2 * | 12/2003 | Nishihara et al. .......... 428/64.1 |
| 2002/0024913 A1 * | 2/2002 | Kojima et al. ................ 369/94 |
| 2004/0076908 A1 * | 4/2004 | Oomachi et al. ...... 430/270.13 |

FOREIGN PATENT DOCUMENTS

| | | | |
|---|---|---|---|
| EP | 387 898 | | 9/1990 |
| EP | 391 423 | | 10/1990 |
| EP | 536406 | * | 4/1997 |
| EP | 825 595 | | 2/1998 |
| EP | 897 177 | | 2/1999 |
| EP | 0917137 | * | 5/1999 |
| EP | 1178476 | * | 2/2002 |
| JP | 63-155442 | | 6/1988 |
| JP | 63-167450 | | 7/1988 |
| JP | 2-273343 | | 11/1990 |
| JP | 3-40240 | | 2/1991 |
| JP | 3-181029 | | 8/1991 |
| JP | 3-231890 | | 10/1991 |
| JP | 3-248338 | | 11/1991 |
| JP | 3-262684 | | 11/1991 |
| JP | 04-041293 | * | 2/1992 |
| JP | 04-251452 | * | 9/1992 |
| JP | 05-151617 | * | 6/1993 |
| JP | 05-242525 | * | 9/1993 |
| JP | 7-161072 | | 6/1995 |
| JP | 7-223372 | | 8/1995 |
| JP | 8-127176 | | 5/1996 |
| JP | 96-34298 | | 9/1997 |
| JP | 10-154351 | | 6/1998 |
| JP | 10-257360 | | 10/1998 |
| JP | 11-238253 | * | 8/1999 |
| JP | 2-261822 | | 10/1999 |
| JP | 2000-195103 | * | 7/2000 |
| JP | 2000-331378 | * | 11/2000 |
| JP | 2001-035014 | | 2/2001 |
| JP | 2002-133718 | | 5/2002 |
| JP | 2002-150609 | | 5/2002 |
| WO | WO 97/34298 | | 9/1997 |

OTHER PUBLICATIONS

Translation of JP 2001-035014, partial.
Translation of JP 2002-133918, partial.
Japanese office action for JP 2002-069647.

* cited by examiner

OPTICAL INFORMATION RECORDING MEDIUM, METHOD FOR MANUFACTURING THE SAME AND RECORDING/REPRODUCTION METHOD

FIELD OF THE INVENTION

The present invention relates to an optical information recording medium with which information can be recorded and reproduced at high speeds and high densities using an optical means such as laser light, as well as a method for manufacturing the same and a recording/reproduction method.

BACKGROUND OF THE INVENTION

Technologies for reproducing or recording information at high densities using laser light are known, and primarily are put into practice in optical disks.

Optical disks can be classified broadly into read-only, write-once and rewritable types. Read-only disks are used as compact disks and laser disks, whereas write-once and rewritable disks are used for documents and data files, for example. For rewritable optical disks, there are optomagnetic and phase-change type disks. Phase-change optical disks utilize the fact that irradiating the recording layer with laser light causes a reversible phase change between amorphous and crystalline (or between one crystalline and a different crystalline structure). Recording is carried out by changing at least one of the refractive index and the attenuation coefficient of a thin film by irradiating laser light. For the reproduction of signals, the amplitude of transmitted light or reflected light changes in this portion, and as a result, the change of the amount of transmitted light or of reflected light that reaches a detection system can be detected.

Phase-change optical disks ordinarily have a configuration of a dielectric layer, a recording layer, a reflective layer and a protective layer formed on a substrate. As an example of the configuration of such a disk, a first dielectric layer, a recording layer, a second dielectric layer, a reflective layer and a protective layer can be layered in this order on a substrate. A further dielectric layer also can be formed on the reflective layer. By reversing the order of those layers, it is also possible to layer them in the order of reflective layer, dielectric layer, recording layer and dielectric layer.

The following explains the role of the dielectric layers. The role of the dielectric layers is to protect the recording layer from mechanical damage, to emphasize optical changes using interference effects due to multiple reflections, to block the influence of outside air and prevent chemical changes, and to reduce roughening of the substrate surface and thermal damage of the recording layer in the case that signals are recorded repeatedly.

In the optical disks disclosed in JP H09(1997)-834298A and JP H10(1998)-275360A, a GeON or a GeN interface layer is provided between the dielectric layers and the recording layer, improving the cycle properties.

For the material of the substrate, it is possible to use glass, quartz, polycarbonate or polymethylmethacrylate. The substrate can have a smooth surface, or it can be provided with groove-shaped protrusions/recesses for tracking guidance. When seen from the side on which laser light is incident when recording or reproducing information, the farther portions, that is the protrusions on the disk substrate, are called "lands," whereas the nearer portions, that is the recesses on the disk substrate, are called "grooves".

For the protective layer, it is possible to use a layer made by dissolving a resin in a solvent, which is then applied and dried, or a layer made by adhering a resin plate with an adhesive.

The recording layer, the dielectric layers and the reflective layers can be formed by vacuum vapor deposition or sputtering on the transparent substrate, for example.

To allow recording and reproducing at higher densities, it has been suggested to make the laser spot smaller by increasing the numerical aperture of the objective lens of the optical system for irradiating the laser light onto the optical disk (see, for example, JP H10(1998)-154351A). In this case, for the purpose of ensuring the tilt tolerance of the disk in the recording/reproducing properties, the protective layer on the side on which the laser light is incident is made thin. For example, a 0.1 mm thick polycarbonate sheet, which is extremely thin in comparison to the 0.6 mm of the protective layer of DVD-RAMs currently on the market, is provided as the protective layer.

In making the protective layer this thin, with a layering order of first dielectric layer, recording layer, second dielectric layer and reflective layer layered on a conventional disk substrate, films had to be formed on a 0.1 mm thin sheet, but considering mass production, the handling of 0.1 mm thin sheets is difficult and impractical. To solve this problem, a manufacturing method is conceivable in which the layering order of the layers is reversed, and the reflective layer, the second dielectric layer, the recording layer and the first dielectric layer are provided on a substrate that is not a 0.1 mm thin sheet (for example, a 1.1 mm thick polycarbonate substrate). However, it was found that in this case the surface of the reflective layer, which has for example Ag as its main component, has depressions/protrusions of about 50 nm width and about 10 nm height, and if the reflective layer is layered first, the dielectric layers and the recording layer are layered on top of the depressions/protrusions of the reflective layer, so that the surface of the recording layer also has large depressions/protrusions, and a constant film thickness could not be attained. This leads to noise during recording and reproduction, and is a cause for deterioration of signal quality.

In order to solve this problem, sputtering with argon gas was performed conventionally during the formation of the Ag reflection layer, and the addition of oxygen or nitrogen to this argon gas improved the surface properties of the Ag reflective film significantly. It is thought that the addition of oxygen gas or the like during the Ag reflective layer formation is indispensable in order to improve the surface properties of the reflective layer. However, if the amount of the added gas is increased too much, then, in the case of nitrogen addition, there is the risk that the explosive chemical compound silver azide is formed. And in the case of oxygen addition, the Ag atoms are activated by the added oxygen, leading to the new problem of a phenomenon similar to the corrosion of Ag when Ag reacts with S.

SUMMARY OF THE INVENTION

In order to solve the above-described problems, it is an object of the present invention to provide an optical information recording medium with superior corrosion resistance, improved signal amplitude and high reliability, as well as a method for manufacturing the same and a recording/reproduction method for the same.

To attain this object, a phase-change optical information recording medium in accordance with the present invention includes, on a transparent substrate, a recording layer in which an optically detectable reversible change between an amorphous phase and a crystalline phase can be caused by irradiation with an energy beam, a reflective layer, and a dielectric layer arranged between the recording layer and the reflective layer;

wherein a main component of the reflective layer is Ag; and wherein a main component of the dielectric layer is at least one selected from the group consisting of an oxide of Ta, nitride of Ta and a nitrooxide of Ta.

Here, "main component" means at least 50 mol %, typically at least 80 mol %.

A method for manufacturing a phase-change optical information recording medium in accordance with the present invention, includes a recording layer formation step of forming on a substrate a recording layer in which an optically detectable reversible change between an amorphous phase and a crystalline phase can be caused by irradiation with an energy beam;

a reflective layer formation step of forming a reflective layer; and a dielectric layer formation step of forming a dielectric layer positioned between the recording layer and the reflective layer;

wherein a main component of the reflective layer is Ag;

wherein a main component of the dielectric layer is at least one selected from the group consisting of an oxide of Ta, nitride of Ta and a nitrooxide of Ta; and wherein a sputtering gas comprising at least one selected from oxygen and nitrogen is used in the formation step of the reflective layer having Ag as its main component.

A recording/reproduction method for a phase-change optical information recording medium in accordance with the present invention includes, on a transparent substrate, a recording layer in which an optically detectable reversible change between an amorphous phase and a crystalline phase can be caused by irradiation with an energy beam, a reflective layer, and a dielectric layer arranged between the recording layer and the reflective layer;

wherein a main component of the reflective layer is Ag; and wherein a main component of the dielectric layer is at least one selected from the group consisting of an oxide of Ta, nitride of Ta and a nitrooxide of Ta.

the method comprising recording or reproducing information with a laser light beam of 300 to 500 nm wavelength.

DETAILED DESCRIPTION OF THE INVENTION

Figure 1:
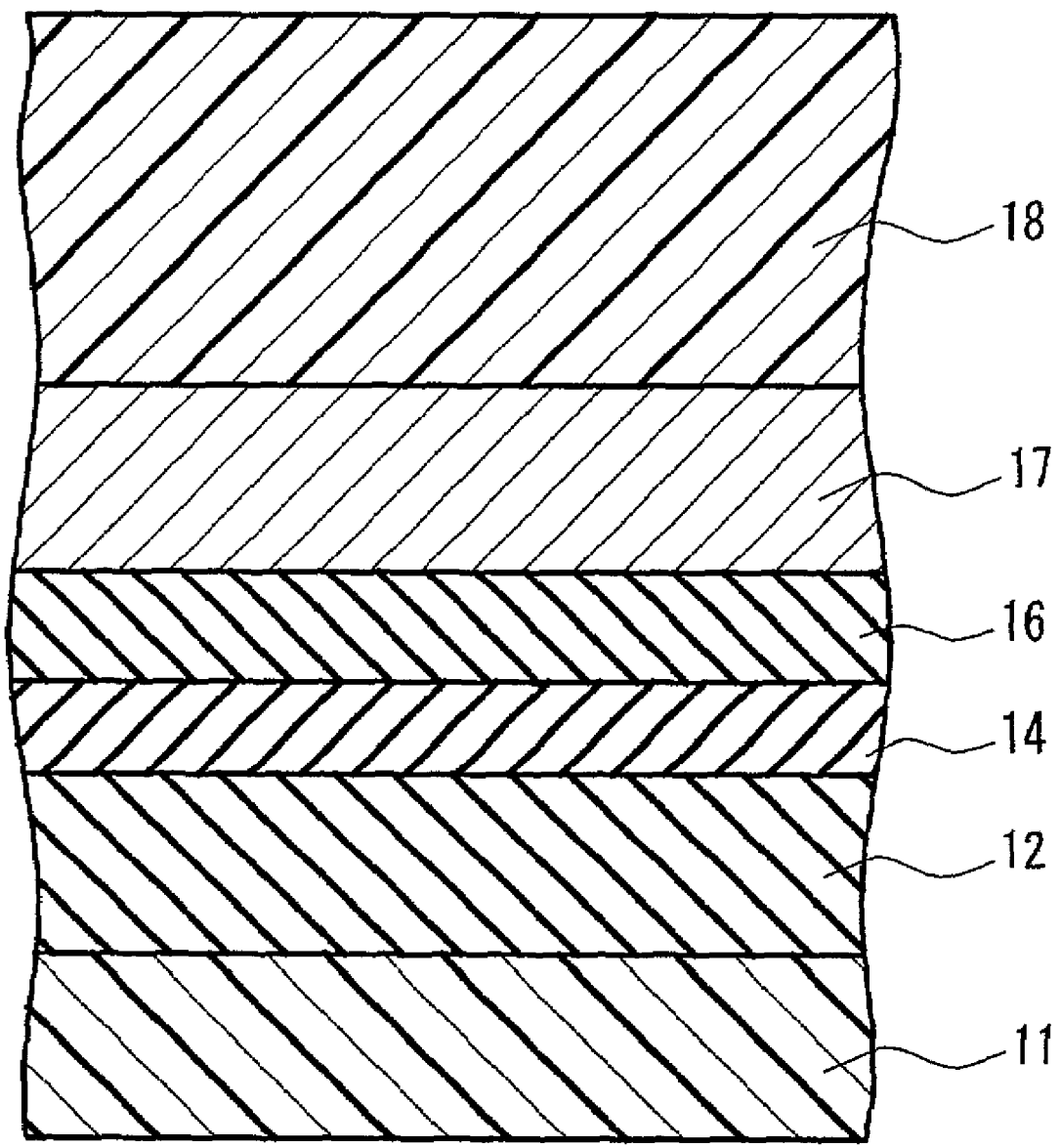
FIG. 1 is a cross-sectional view of an optical disk in accordance with Working Example 1 of the present invention.

In general, the present invention adoptions one or both of the following configurations:

(1) A phase-change optical disk provided, on a transparent substrate, with a recording layer in which an optically detectable reversible change between an amorphous phase and a crystalline phase can be caused by irradiation with an energy beam, a reflective layer, and a dielectric layer arranged between the recording layer and the reflective layer, wherein the main component of the dielectric layer is an oxide or a nitrooxide of Ta.

(2) Between the recording layer and the dielectric layer, or between the reflective layer and the dielectric layer, a layer comprising carbon (C) or a nitride, an oxide, a carbide or nitrooxide of an element α (wherein α is at least one element selected from Sn, In, Zr, Si, Cr, Al, V, Nb, Mo, W, Ti, Mg and Ge) is provided.

It has been found that with regard to the two problems of corrosion of the Ag reflective layer and the heat releasing ability (coolability) of the disk, it is useful to introduce a second dielectric layer having as its main component an oxide, nitride or a nitrooxide of Ta. Regarding corrosion of the Ag reflective layer, ionization of Ag (which is the first stage of corrosion) does not occur, because the nitride, oxide or nitrooxide of Ta does not include sulfur, so that corrosion also cannot be observed after a high-temperature high-humidity test. Regarding the heat releasing ability of the disk, because of the film properties, namely that the oxides or nitrooxides of Ta have substantially the same optical constants as $ZnS-SiO_2$ and their thermal conductivity is better than that of $ZnS-SiO_2$ (i.e. they have better heat releasing ability), the result is achieved that the disk reflectivity is the same as when using $ZnS-SiO_2$ for the second dielectric layer, but the signal amplitude is improved.

Furthermore, with regard to the problem that exfoliation occurs after a high-temperature high-humidity test between the oxide, nitride or nitrooxide film of Ta and the recording layer, by providing an interface layer including carbon (C) or a nitride, an oxide, a carbide or nitrooxide of an element α (wherein α is at least one element selected from Sn, In, Zr, Si, Cr, Al, V, Nb, Mo, W, Ti, Mg and Ge) between the recording film and the dielectric layer, a disk is obtained, in which exfoliation does not occur, regardless of film forming conditions for the oxide or nitrooxide film of Ta.

Furthermore, regarding the corrosion of Ag, which occurred when adding oxygen or nitrogen in order to improve the surface properties of the Ag reflective film, by providing an interface layer between the recording layer and the dielectric layer or between the reflective layer and the dielectric layer, a disk is obtained, in which the diffusion of Ag activated by oxygen is inhibited and corrosion does not occur.

To improve corrosion resistance of the Ag reflective layer like this, it is preferable to form two layers using an oxide, nitride or nitrooxide of Ta as the dielectric layer and providing an interface layer including carbon (C) or a nitride, an oxide, a carbide or nitrooxide of an element α (wherein α is at least one element selected from Sn, In, Zr, Si, Cr, Al, V, Nb, Mo, W, Ti, Mg and Ge).

In the present invention, it is preferable that the reflective layer, the dielectric layer and the recording layer are formed in this order on the substrate. With this preferable configuration, irradiation from the recording layer side is possible when using a blue light emitting laser.

It is preferable that a first interface layer is further arranged between the recording layer and the dielectric layer. With this preferable configuration, it is possible to prevent the diffusion of atoms between the recording layer and the dielectric layer.

It is preferable that a second interface layer is arranged between the dielectric layer and the reflective layer. With this preferable configuration, it is possible to prevent the diffusion of Ag from the reflective layer.

It is preferable that the first interface layer is at least 1 nm and at most 10 nm thick, and more preferable at least 1 nm and at most 5 nm thick.

It is preferable that the second interface layer is at least 1 nm and at most 10 nm thick, and more preferable at least 1 nm and at most 5 nm thick.

It is preferable that the recording layer includes Sb and Te.

It is preferable that the dielectric layer further comprises at least one selected from the group consisting of $SiO_2$, $Al_2O_3$, GeN, $Si_3N_4$, $Al_3N_4$, GeON, SiON, and AlON.

It is preferable that a protective film further is provided on an outer surface opposite from the substrate. The protective film can be made for example of a light-curable resin.

As explained above, according to the present invention, the main component of the reflective layer is Ag, and the main component of the dielectric layer is at least one selected from an oxide of Ta, nitride of Ta or a nitrooxide of Ta, whereby an optical disk can be provided, that has excellent corrosion resistance, improved signal amplitude and high reliability.

In particular, by using an oxide, nitride of Ta or nitrooxide of Ta as the second dielectric layer and providing between the recording layer and the second dielectric layer or between the reflective layer and the second dielectric layer a layer of C or a nitride, oxide, carbide or nitrooxide of an element α (wherein α is at least one element selected from Sn, In, Zr, Si, Cr, Al, V, Nb, Mo, W, Ti, Mg and Ge), an optical disk can be provided, that has excellent corrosion resistance, improved signal amplitude and high reliability.

WORKING EXAMPLES

The following is a more detailed explanation of the present invention, with reference to specific working examples.

Working Example 1

Referring to FIG. 1, the structure of a disk using this working example is explained. Dielectric layers, recording layer and reflective layer were formed by an ordinary thin film forming method (sputtering) on a transparent resin disk substrate 11. A first dielectric layer 12, a recording layer 14, a second dielectric layer 16 and a reflective layer 17 are provided in that order on the disk substrate 11. On top of that, a closely adhered protective layer 18 was provided In this working example, a polycarbonate substrate was used for the substrate 11. Moreover, the disk substrate that was used had groove-shaped protrusions/recessions for tracking in its surface.

Using a UV curing resin (adhesive), a polycarbonate substrate was adhered as the protective layer 18 on the films layered by film formation on the substrate 11.

The following explains the results of observing the Ag corrosion after a high-temperature high-humidity test when using an oxide or a nitrooxide of Ta as the second dielectric layer.

For the disk in this working example, a substrate made of 0.6 mm thick polycarbonate with a diameter of 120 mm having signal recording tracks was used. Grooves and lands were formed in alternation every 0.34 μm in the substrate.

A ZnS—$SiO_2$ mixed film of 100 nm thickness was formed by sputtering as the first dielectric layer on the disk substrate.

The recording layer was formed in a thickness of 12 nm with a composition of Ge:Sb:Te=21.5:24.7:53.8 by atom %.

For reference, a ZnS—$SiO_2$ film of 50 nm thickness was formed as the second dielectric layer. The film forming conditions when using an oxide or nitrooxide of Ta for the second dielectric layer as in the present invention were as follows: Using a sputtering target of $Ta_2O_5$ and a mixed gas of Ar and $O_2$ (with 10% $O_2$ concentration) as the film forming gas, a 50 nm Ta oxide film was formed. Alternatively, using a mixed gas of Ar and $N_2$ (with 10% $N_2$ concentration) as the film forming gas, a 50 nm Ta nitrooxide film was formed.

The reflective layer was formed by forming an Ag film of 100 nm thickness by sputtering. A protective film of polycarbonate was provided on top of that.

These disks were subjected to a weatherability test at 90° C. and 80% relative humidity for 100 hr, and corrosion was observed with an optical microscope. The results were as listed in Table 1.

TABLE 1

| second dielectric layer | observed corrosion |
|---|---|
| (1) ZnS—$SiO_2$ | corrosion |
| (2) Ta oxide | no corrosion |
| (3) Ta nitrooxide | no corrosion |

According to Table 1, corrosion could be observed when ZnS—$SiO_2$ was used as the second dielectric layer. On the other hand, there was no corrosion when an oxide or nitrooxide of Ta was used as the second dielectric layer, as in the present invention. Thus, a disk without corrosion of Ag was obtained by providing an oxide or nitrooxide of Ta as the second dielectric layer.

It should be noted that a GeSbTe system was explained as the recording layer, but similar results were obtained when using a recording layer of another composition including at least one of the elements Sb and Te.

Figure 2:
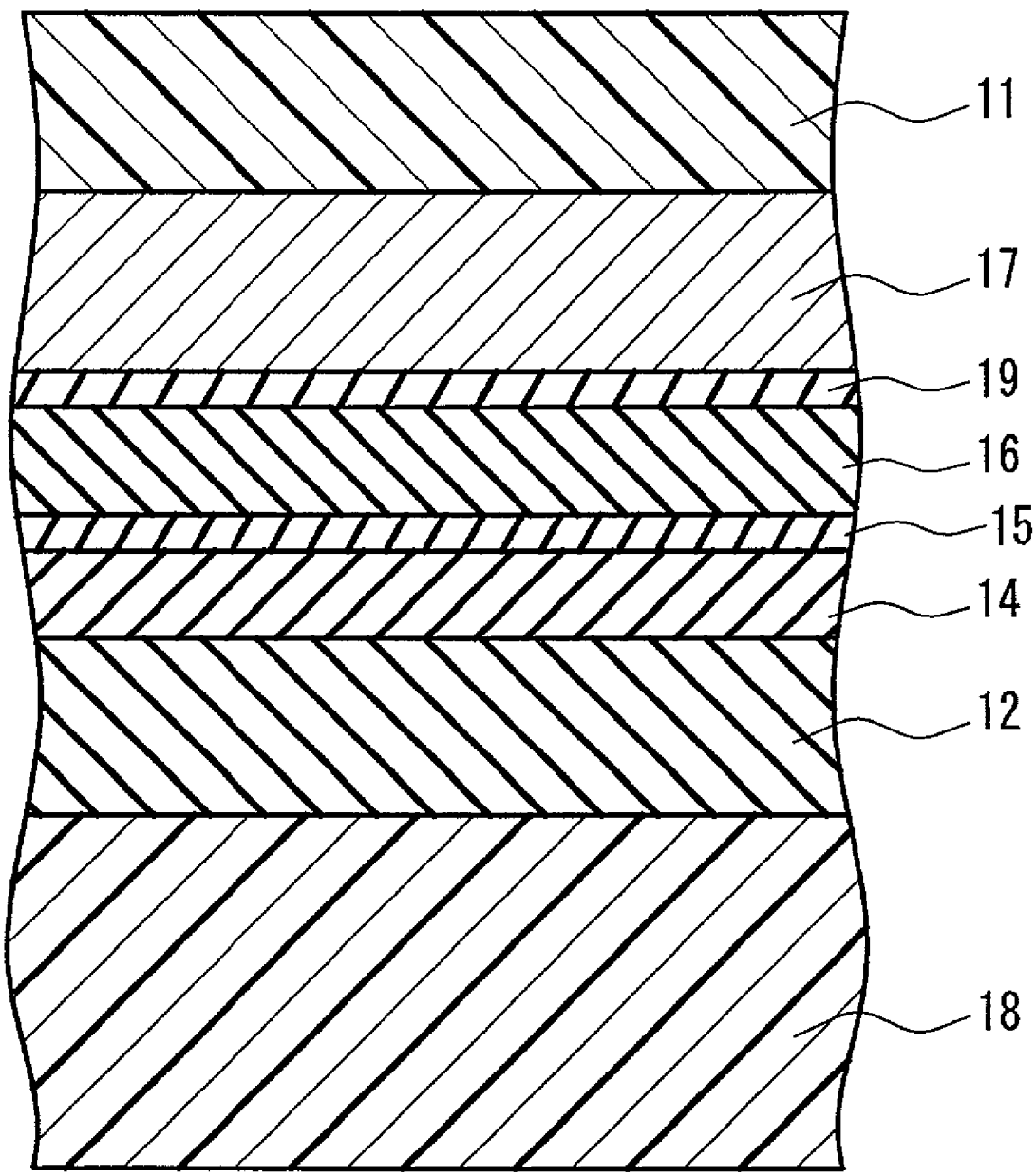
FIG. 2 is a cross-sectional view of another optical disk in accordance with Working Example 1 of the present invention.

In the present working example, the first dielectric layer 12, the recording layer 14, the second dielectric layer 16 and the reflective layer 17 were formed in that order on the substrate 11, but similar results were attained when layering the reflective layer 17, a second interface layer 19, the second dielectric layer 16, a first interface layer 15, the recording film 14, the first dielectric layer 12 and the protective film 18 in that order on the substrate 11, as shown in FIG. 2. For the first interface layer 15 and the second interface layer 19, a GeN film of 5 nm thickness was formed by sputtering in a mixed gas atmosphere of argon gas (80 vol. %) and nitrogen gas (20 vol. %).

It should be noted that similar results were obtained also when providing interface layers including carbon (C) or a nitride, an oxide, a carbide or nitrooxide of an element α (wherein α is at least one element selected from Sn, In, Zr, Si, Cr, Al, V, Nb, Mo, W, Ti, Mg and Ge), when providing an interface layer between the first dielectric layer and the recording layer or between the recording layer and the second dielectric layer, and in a disk having both of those two interface layers.

Furthermore, the present working example has been explained for the case that an oxide of Ta or a nitrooxide of Ta was used for the dielectric layer, but the same results also were obtained for configurations including at least one selected from $SiO_2$, $Al_2O_3$, GeN, $Si_3N_4$, $Al_3N_4$, GeON, SiON, and AlON in the oxide of Ta or nitrooxide of Ta.

Working Example 2

The following is an explanation of a signal amplitude evaluation when using an oxide or nitrooxide of Ta in the disk of Working Example 1.

The disk configuration used in this working example was the same as for Working Example 1.

The recording and reproduction properties of the disks were evaluated with the following method: To record and reproduce a signal on the optical disks, a laser with a wavelength of 400 nm and a NA of 0.65 was used. As the recorded signals, marks with a shortest mark length (3T marks) of 0.26 µm were recorded in the groove portions at a linear velocity of 8.6 m/s and suitable laser power by 8–16 modulation, and the signal amplitude was measured. Table 2 lists the resulting signal amplitudes.

TABLE 2

| second dielectric layer | signal amplitude |
|---|---|
| (1) ZnS—SiO$_2$ | −30.5 dBm |
| (2) Ta oxide | −29.2 dBm |
| (3) Ta nitrooxide | −29.5 dBm |

According to Table 2, it was found that when using an oxide of Ta or a nitrooxide of Ta as in the present invention, the signal amplitude was better than when using ZnS—SiO$_2$ (reference case) for the second dielectric layer. By using an oxide of Ta or a nitrooxide of Ta for the second dielectric layer as described above, the heat releasing ability is enhanced, larger recording marks can be formed, and the signal amplitude is improved.

With Working Example 1 and Working Example 2, a disk was attained, in which the signal amplitude was improved without Ag corrosion when an oxide or a nitrooxide of Ta was used as the second dielectric layer.

It should be noted that a GeSbTe system was explained as the recording layer, but similar results also were obtained when using a recording layer of another composition including at least one of the elements Sb and Te.

Figure 3:
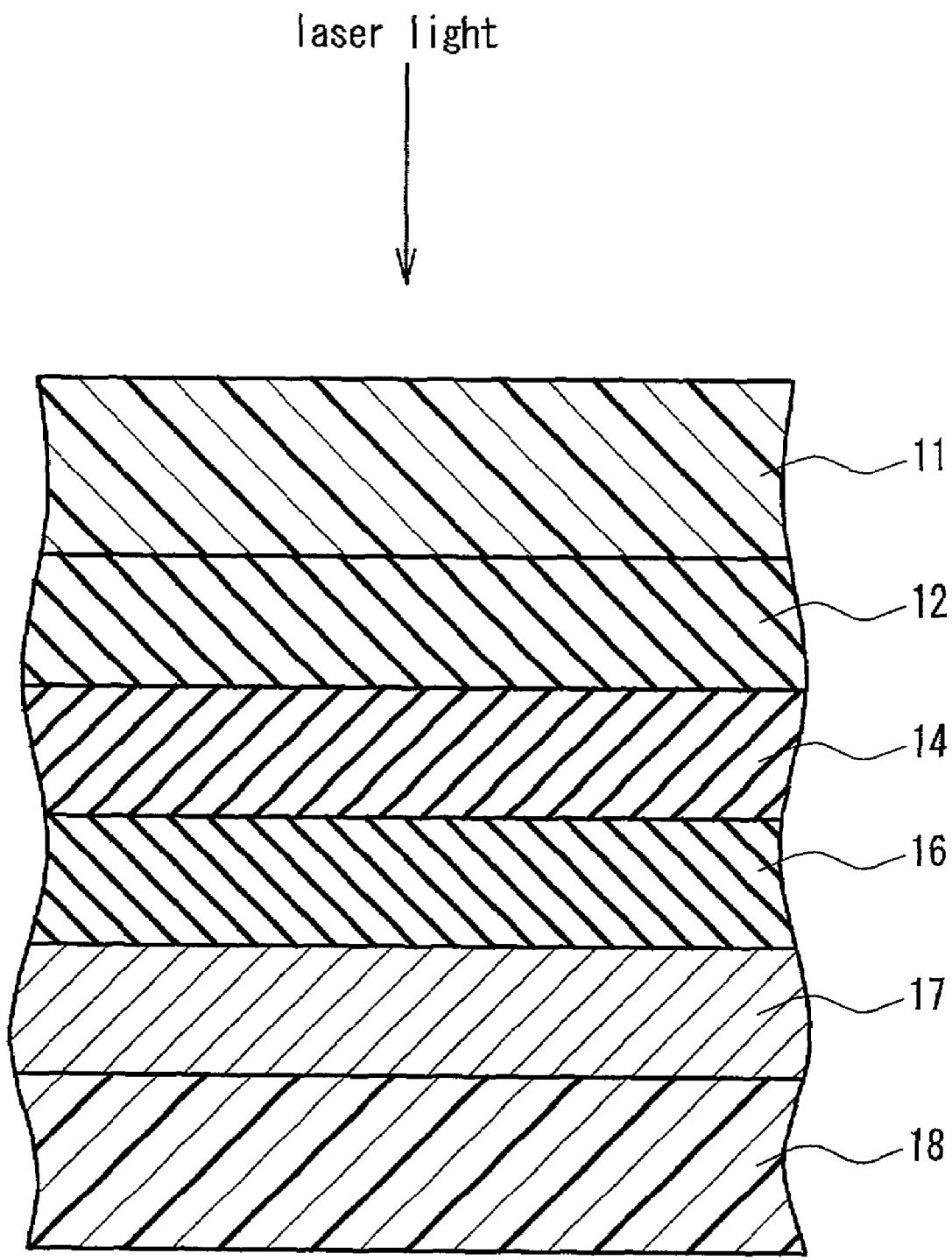
FIG. 3 is a cross-sectional view of an optical disk in accordance with Working Example 2 of the present invention.

In the present working example, the first dielectric layer 12, the recording layer 14, the second dielectric layer 16, the reflective layer 17 and the protective layer 18 were formed in that order on the substrate 11, as shown in FIG. 3, but similar results were attained also when layering a reflective layer, a second dielectric layer, a recording layer and a first dielectric layer in that order on the substrate 11.

It should be noted that the same results were obtained when providing interface layers including carbon (C) or a nitride, an oxide, a carbide or nitrooxide of an element α (wherein α is at least one element selected from Sn, In, Zr, Si, Cr, Al, V, Nb, Mo, W, Ti, Mg and Ge), when providing an interface layer between the first dielectric layer and the recording layer or between the recording layer and the second dielectric layer, and in a disk having both of those two interface layers.

Furthermore, the present working example has been explained for the case that an oxide of Ta or a nitrooxide of Ta was used for the dielectric layer, but the same results also were obtained for configurations including at least one selected from SiO$_2$, Al$_2$O$_3$, GeN, Si$_3$N$_4$, Al$_3$N$_4$, GeON, SiON, and AlON in the oxide of Ta or nitrooxide of Ta.

Working Example 3

The following is an explanation of the film forming conditions of the oxide or nitrooxide of Ta and film exfoliation, when a layer of a nitride, an oxide, a carbide or a nitrooxide of an element α (wherein α is at least one element selected from Sn, In, Zr, Si, Cr, Al, V, Nb, Mo, W, Ti, Mg and Ge) was provided between the recording layer and the second dielectric layer (oxide or nitrooxide of Ta).

The disk configuration used in this working example was the same as in Working Example 1.

Furthermore, the film forming conditions when using an oxide or nitrooxide for the second dielectric layer, as in the present invention, were as follows. Using a sputtering target of Ta$_2$O$_5$ and a mixed gas of Ar and O$_2$ (with 0 to 50% O$_2$ concentration) as the film forming gas, a 50 nm thick Ta oxide film was formed. Alternatively, using a mixed gas of Ar and N$_2$ (with 10% N$_2$ concentration) as the film forming gas, a 50 nm thick Ta nitrooxide film was formed.

Another case that was examined was that of providing a GeN film as an interface film for the prevention of exfoliation between the recording layer 14 and the second dielectric layer 16 as shown in FIG. 2. The GeN film was formed in a thickness of 5 nm by sputtering Ge in a mixed gas atmosphere of argon gas (80 vol. %) and nitrogen gas (20 vol. %).

These disks were subjected to a weatherability test at 90° C. temperature and 80% relative humidity for 100 hr, and exfoliation between the recording layer and the oxide or nitrooxide of Ta was observed with an optical microscope. The results were as listed in Table 3.

TABLE 3

| film-forming conditions (vol. %) for second dielectric layer (Ta) | with GeN film | without GeN film |
|---|---|---|
| (1) O$_2$: 0% | exfoliation | exfoliation |
| (2) O$_2$: 10% | no exfoliation | no exfoliation |
| (3) O$_2$: 20% | no exfoliation | no exfoliation |
| (4) O$_2$: 30% | no exfoliation | exfoliation |
| (5) O$_2$: 40% | no exfoliation | exfoliation |
| (6) O$_2$: 50% | no exfoliation | exfoliation |
| (7) N$_2$: 0% | exfoliation | exfoliation |
| (8) N$_2$: 10% | no exfoliation | no exfoliation |
| (9) N$_2$: 20% | no exfoliation | no exfoliation |
| (10) N$_2$: 30% | no exfoliation | exfoliation |
| (11) N$_2$: 40% | no exfoliation | exfoliation |
| (12) N$_2$: 50% | no exfoliation | exfoliation |

According to Table 3, when there is no GeN film between the recording layer and the second dielectric layer, no exfoliation could be observed if the Ta film forming conditions were O$_2$:10 to 20% or N$_2$:10 to 20%, but exfoliation occurred in all other cases. On the other hand, when a GeN film was provided as in the present invention, exfoliation did not occur at Ta film forming conditions in the ranges of O$_2$:10 to 50% and N$_2$:10 to 50%, and the range for film forming conditions without exfoliation was significantly expanded compared to the case without the GeN film.

It should be noted that a GeSbTe system was explained as the recording layer, but similar results also were obtained when using a recording layer of another composition including at least one of the elements Sb and Te.

In the present working example, the first dielectric layer, the recording layer, the second dielectric layer and the reflective layer were formed in that order on the substrate 11, but similar results were attained also when layering a reflective layer, a second dielectric layer, a recording layer and a first dielectric layer in that order on the substrate 11.

It should be noted that the same results were obtained also when providing interface layers including C or a nitride, an oxide, a carbide or nitrooxide layer of an element α (wherein α is at least one element selected from Sn, In, Zr, Si, Cr, Al, V, Nb, Mo, W, Ti, Mg and Ge), when providing an interface layer between the first dielectric layer and the recording layer or between the recording layer and the second dielectric layer, and in a disk having both of those two interface layers.

Furthermore, the present working example has been explained for the case that an oxide of Ta or a nitrooxide of Ta was used for the dielectric layer, but similar results also were obtained for configurations including at least one selected from $SiO_2$, $Al_2O_3$, GeN, $Si_3N_4$, $Al_3N_4$, GeON, SiON, and AlON in the oxide of Ta or nitrooxide of Ta.

Working Example 4

The following is an explanation of the results of observing the Ag corrosion after a high-temperature high-humidity test on disks, in which oxygen gas was added during the film formation of the reflective layer, and the surface properties were improved.

For the disk in this working example, a substrate made of polycarbonate with a diameter of 120 mm having signal recording tracks was used. Grooves and lands were formed in alternation every 0.34 µm in the substrate.

Figure 4:
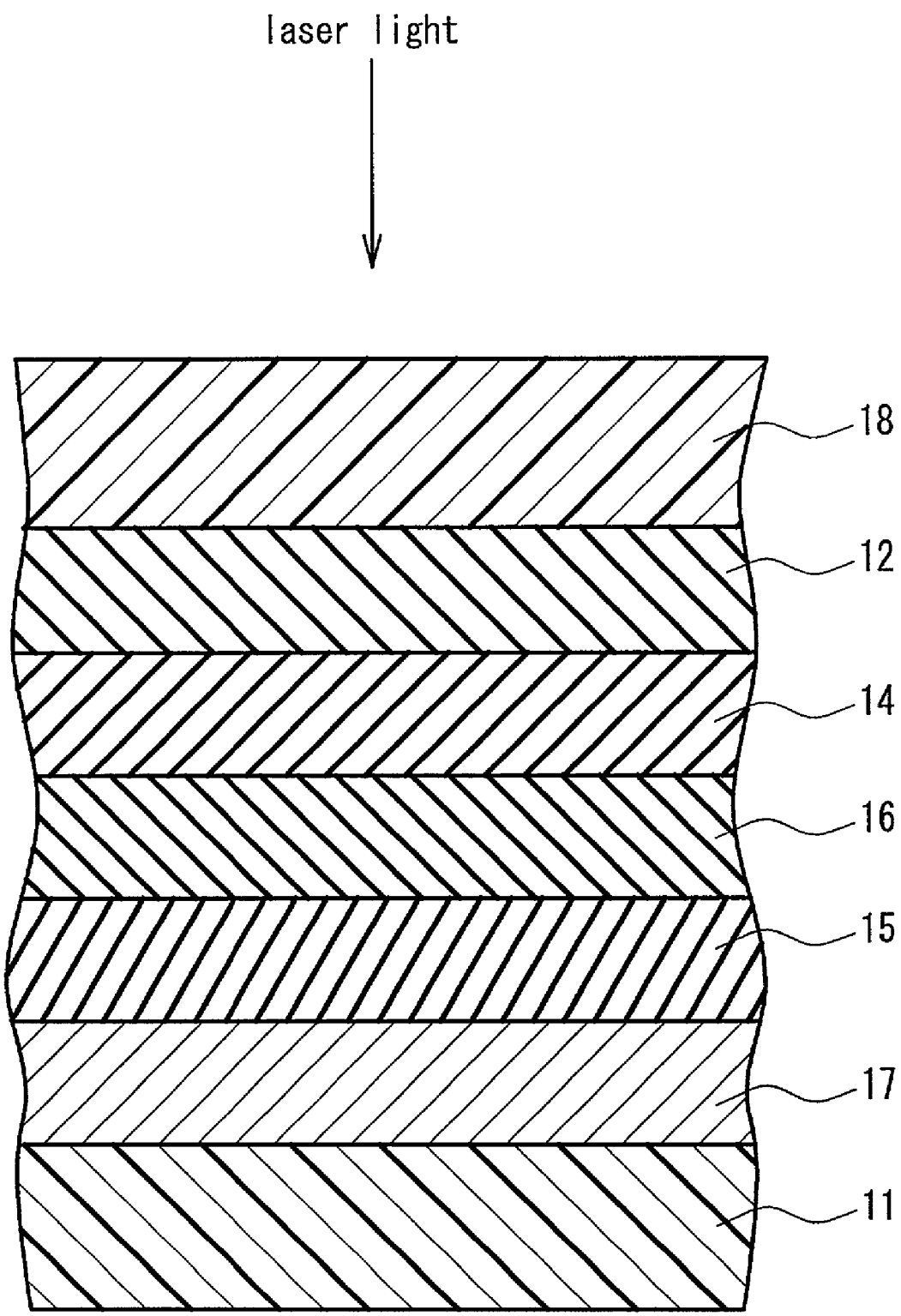
FIG. 4 is a cross-sectional view of an optical disk in accordance with Working Example 4 of the present invention.

The film formation of the disk was similar to Working Example 1, but as shown in FIG. 4, the layering order of the layers was reflective layer, dielectric layer, recording layer and dielectric layer. That is to say, on a substrate of 1.1 mm thickness, a 100 nm Ag reflective layer 17, a 50 nm $Ta_2O_5$ layer serving as the second dielectric layer 16, a 12 nm recording layer, and a 100 nm mixed film of ZnS—$SiO_2$ serving as the first dielectric layer 12 were formed by sputtering. The protective layer 18 was formed on the surface of the first dielectric layer 12. The protective layer 18 was formed to a total thickness of 100 µm by adhering a polycarbonate sheet of 80 µm with a UV curing resin adhesive (of 20 µm) thickness.

The amount of gas added during the formation of the reflective layer was varied between 0 and 40 vol. %.

Furthermore, while changing the film thickness at which the GeN interface layer 15 was provided, the disks were examined in the same manner as in Working Example 3.

The disks were subjected to a weatherability test at 90° C. and 80% relative humidity for 100 hr, and corrosion was observed with an optical microscope. Table 4 lists the dependency of the corrosion on the oxygen concentration during the Ag film formation when the GeN interface layer was provided at a constant thickness of 5 nm between the recording layer and the $Ta_2O_5$ dielectric layer.

TABLE 4

| oxygen concentration (vol. %) | Occurrence of corrosion with GeN interface layer | Occurrence of corrosion without GeN interface layer |
| --- | --- | --- |
| 0 | no | no |
| 1 | no | no |
| 3 | no | yes |
| 10 | no | yes |
| 20 | no | yes |
| 40 | no | yes |

According to Table 4, without the interface layer, corrosion of the Ag reflective layer occurs at an oxygen concentration of 3 vol. % or more during the Ag film formation even when a $Ta_2O_5$ dielectric layer is provided. However, if a GeN interface layer is interposed as in the present invention, then the diffusion of Ag is inhibited by this interface layer, and a disk with higher reliability and without corrosion can be obtained. Furthermore, it was found that at an oxygen concentration of less than 3 vol. % during the Ag film formation, the surface properties of the Ag reflective film are not improved, and evaluating the noise during recording and reproduction, it was found that an oxygen concentration of at least 3 vol. % is necessary.

The dependency of the corrosion on the thickness of the GeN interface layer is shown in Table 5. The amount of oxygen added during the film formation of the Ag reflective layer was held constant at 20 vol. %.

TABLE 5

| GeN thickness | corrosion |
| --- | --- |
| 0 nm | yes |
| 1 nm | no |
| 5 nm | no |
| 10 nm | no |

From Table 5, it can be seen that corrosion of the Ag reflective layer can be prevented when the thickness of the GeN interface layer is at least 1 nm.

Also the case in which a GeN interface layer was provided between the reflective layer and the $Ta_2O_5$ dielectric layer was examined similarly. The results were similar to the results of the previous two tables, and corrosion resistance was improved.

It should be noted that a GeSbTe system was explained as the recording layer, but results similar to the previous two tables were also obtained when using a recording layer of another composition including at least one of the elements Sb and Te.

It should be noted that similar results were obtained also when providing interface layers including C or a nitride, an oxide, a carbide or nitrooxide layer of an element α (wherein α is at least one element selected from Sn, In, Zr, Si, Cr, Al, V, Nb, Mo, W, Ti, Mg and Ge), when providing an interface layer between the first dielectric layer and the recording layer or between the recording layer and the second dielectric layer, and in a disk having both of those two interface layers.

Furthermore, the present working example has been explained for the case that an oxide of Ta, nitride of Ta or a nitrooxide of Ta was used for the dielectric layer, but the same results also were obtained for configurations including at least one selected from $SiO_2$, $Al_2O_3$, GeN, $Si_3N_4$, $Al_3N_4$, GeON, SiON, and AlON in the oxide of Ta or nitrooxide of Ta.

Comparative Example 1

Figure 5:
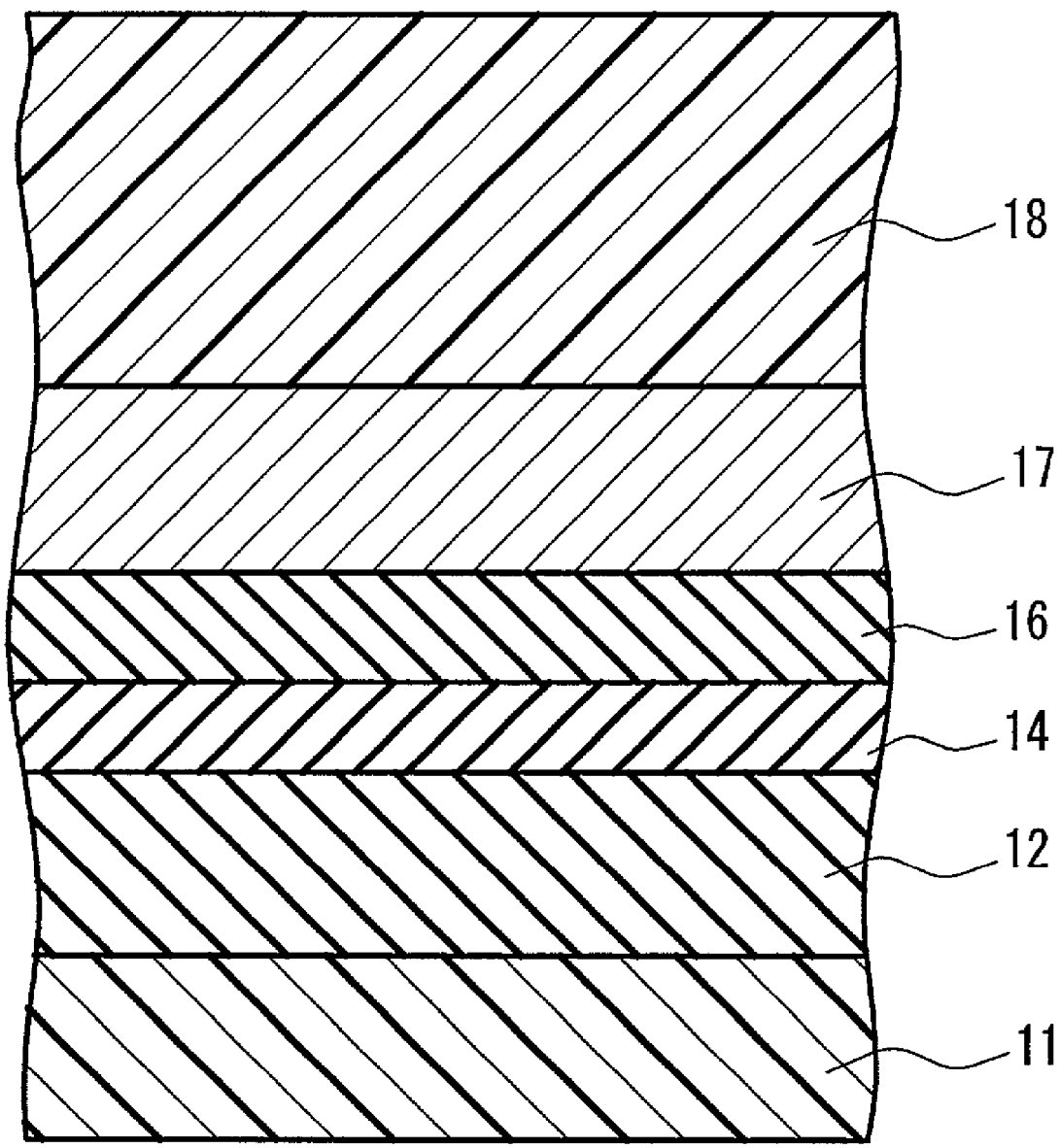
FIG. 5 is a cross-sectional view of a conventional optical disk in accordance with Comparative Example 1.

A disk with the configuration shown in FIG. 5 was produced. This configuration has been developed for recording and reproduction in the wavelength region of blue laser light (300 to 500 nm). That is to say, a first dielectric layer 12, a recording layer 14, a second dielectric layer 16 and a reflective layer 17 were layered in that order on a disk substrate 11, and a protective layer is closely adhered on top of that. In this case, ZnS:80 mol %–SiO2:20 mol % was used for the first and second dielectric layers, a GeSbTe system composition was used for the recording layer, and an Ag-based material was used for the reflective layer.

Various reflective layer materials have been studied before reaching the disk configuration shown in FIG. 5. For the decision regarding the material of the reflective layer, two aspects were considered. The first is whether the difference of the reflectivity in the amorphous state and the crystalline state of the recording layer in the disk configuration is large, and whether the optical constants of the reflective layer are such that the a large signal amplitude can be attained. Table 6 shows the difference of the reflectivity in the amorphous state and the crystalline state of the recording layer in the disk configuration at the wavelength of blue laser light for various reflective layer materials. When the film thickness of the layers is changed, the values of the reflectivity differences in Table 6 change as well. In the results of Table 6, the film thicknesses of the various layers are realistic film thickness that have been adjusted considering recording sensitivity and mass production of the disk for the corresponding of the reflective layer material, optimized within feasible ranges, because problems regarding material costs and film-forming cycle may occur when the film thicknesses are too thick.

TABLE 6

| reflective layer material | Reflectivity difference |
| --- | --- |
| Ag | 17.4% |
| Au | 14.2% |
| Ni | 16.3% |
| Al | 17.0% |

Reflectivity difference between amorphous and crystalline state

According to Table 6, when using Ag, Al or Ni as the material for the reflective layer, a large reflectivity difference between the amorphous and the crystalline state, or in other words, favorable disk properties with high signal quality can be attained. By increasing the heat dissipation rate of the recording layer, larger recording marks can be formed, and thus the signal quality is improved. Table 7 shows the coefficients of thermal conductivity of the various reflective layer materials.

TABLE 7

| Material | coefficient of thermal conductivity (k/Wm$^{-1}$K$^{-1}$) |
| --- | --- |
| Ag | 427 |
| Au | 315 |
| Ni | 90.5 |
| Al | 237 |

Coefficient of thermal conductivity at 300K

From Table 7, it can be seen that the coefficient of thermal conductivity of Ag is at least about twice as high as that of Al or Ni.

With regard to those two aspects, it was determined that an Ag-based material is most suitable as the material for the reflective layer. Also when using these reflective layer materials to form disks and comparing the signal quality, the signal quality when using an Ag reflective layer was the most favorable.

Furthermore, the reason for using ZnS: 80 mol %–SiO$_2$: 20 mol % as the material for the first and second dielectric layers is that this material satisfies all of the afore-mentioned requirements of the dielectric layer. Furthermore, the reason for using a GeSbTe composition as the material for the recording layer is that the change of its optical constants that have a large influence on the reflectivity difference between the amorphous state and the crystalline state of the recording layer in this disk configuration is also large and thus suitable in the wavelength region of blue laser light.

As the result of various evaluations, the following two aspects can be given as the problems of the disk shown in FIG. 5.

The first problem is that of film corrosion. The disks were kept for 100 hr in an environment of 90° C. temperature and 80% relative humidity (ordinary life testing conditions), and then the corrosion of the film was observed with an optical microscope. As a result, when observing with transmitted light, there were many occurrences of white corrosion of 0.1 mm diameter. It can be assumed that the mechanism behind this Ag corrosion is as follows. In this corrosion, S atoms included in the second dielectric layer react with Ag atoms, which are the main component of the reflective layer, ionizing the Ag atoms. In general, the surface of Ag products becomes black after several months or years, and it is well known that this is a result of the Ag reacting with S atoms in the air, the reaction between S and Ag being one that occurs easily. When the Ag atoms are ionized, the mobility of the Ag is increased, and the Ag ions may reach the recording layer through passes (holes through which the Ag ions can pass) in the ZnS—SiO$_2$ dielectric layer. It was confirmed by Auger electron spectroscopy that a large amount of Ag atoms was present in the recording layer. The Ag ions that have reached the recording layer bond with Te and Sb, which have a high affinity for Ag. When this reaction occurs consecutively, the Ag amount in the reflective layer decreases near the pass portions in the ZnS—SiO$_2$ layer, and the optical transparency increases. The optical transparency is further increased as the Ag that has moved into the recording layer reacts with Te and Sb, and it seems that this is what can be observed as corrosion under the optical microscope. However, as explained above, each of the substances that cause the corrosion of the Ag are necessary with regard to other properties, so that not one of those elements could be removed.

The second problem is the decline of the signal quality due to insufficient heat release. In phase-change optical disks, the recording layer is locally heated by irradiation with laser light, and a rewriting recording is carried out by reversibly changing between amorphous and crystalline states. Therein, the portions that have been irradiated with relatively strong power become amorphous in a quenching process after melting, and the portions that have been irradiated with relatively weak power become crystalline in an annealing process. It was found that in a four-layer disk using ZnS—SiO$_2$ for the second dielectric layer, when the recording layer is made amorphous, the outer side of the portions that have been melted may crystallize again because of insufficient cooling speed. Due to this recrystallization, the amorphous regions (recording marks) become small, and therefore, there is the problem that the signal amplitude becomes small and the signal quality decreases. This problem can be solved by changing the disk configuration into a configuration that cools more easily. To attain a configuration that cools more easily, it is conceivable to make the reflective layer thicker and the second dielectric layer thinner. However, considering mass production of the disk, making the Ag reflective layer thicker makes the film material more expensive, leading to the problem of higher costs, and is therefore not an option. Furthermore, making the second dielectric layer thinner has a large influence on the reflectivities of the crystalline state and the amorphous state of the recording layer, so that making it thinner also leads to the problem that the signal quality decreases. Because of these problems, another approach is necessary to improve the cooling speed of the disk.

As a means to solve the two problems of Ag reflective layer corrosion and improving the cooling speed of the disk, the use of an oxide or an nitrooxide of Ta as the second dielectric layer was examined. However, depending on the Ta film forming conditions, this lead to the third problem, namely exfoliation occurring between the recording layer and the film of the oxide, nitride of Ta or nitrooxide of Ta, after the high-temperature high-humidity test. The margins for the Ta film forming conditions at which no exfoliation occurs are small, and considering mass production of the disk, there is the possibility that the yield drops.

According to the above results, a highly reliable disk with superior corrosion resistance and improved signal amplitude could not be attained, unless the main component of the reflective layer is Ag, and the main component of the dielectric layers is at least one selected from an oxide of Ta, nitride of Ta and a nitrooxide of Ta, as in the present invention.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A phase-change optical information recording medium comprising, on a transparent substrate, a recording layer in which an optically detectable reversible change between an amorphous phase and a crystalline phase can be caused by irradiation with an energy beam, a reflective layer, a dielectric layer arranged between the recording layer and the reflective layer, a first interface layer arranged between the recording layer and the dielectric layer, and a second interface layer arranged between the dielectric layer and the reflective layer and in contact with the reflective layer;

wherein the recording layer, the dielectric layer, and the reflective layer are formed in this order on the substrate, a main component of the reflective layer is Ag;

a main component of the dielectric layer is at least one selected from the group consisting of an oxide of Ta, nitride of Ta and a nitrooxide of Ta;

the recording layer includes Sb and Te;

a thickness of the first interface layer is at least 1 nm and at most 10 nm;

the second interface lager includes at least one selected from the group consisting of carbon (C), a nitride of an element α (wherein α is at least one element selected from Sn, In, Zr, Si, Cr, Al, V, Nb, Mo, W, Ti, Mg and Ge), an oxide of element α, a carbide of element α, and a nitrooxide of element α, and the recording medium being able to record and reproduce information with a laser light beam of 300 to 500 nm wavelength.

2. The optical information recording medium according to claim 1, wherein the first interface layer includes at least one selected from the group consisting of carbon (C), a nitride of an element α (wherein α is at least one element selected from Sn, In, Zr, Si, Cr, Al, V, Nb, Mo, W, Ti, Mg and Ge), an oxide of element α, a carbide of element α, and a nitrooxide of element α.

3. The optical information recording medium according to claim 1, wherein a thickness of the second interface layer is at least 1 nm and at most 10 nm.

4. The optical information recording medium according to claim 1, wherein the dielectric layer further comprises at least one selected from the group consisting of $SiO_2$, $Al_2O_3$, GeN, $Si_3N_4$, $Al_3N_4$, GeON, SiON, and AlON.

5. The optical information recording medium according to claim 1, further comprising a protective film on an outer surface opposite to the substrate.

6. The optical information recording medium according to claim 1, wherein the reflective layer is formed by sputtering with a sputtering gas that comprises oxygen or oxygen and nitrogen.

7. A method for manufacturing a phase-change optical information recording medium, comprising:

a recording layer formation step of forming on a substrate a recording layer in which an optically detectable reversible change between an amorphous phase and a crystalline phase can be caused by irradiation with an energy beam;

a reflective layer formation step of forming a reflective layer;

a dielectric layer formation step of forming a dielectric layer positioned between the recording layer and the reflective layer;

a step of forming a first interface layer arranged between the recording layer and the dielectric layer; and a step of forming a second interface layer arranged between the dielectric layer and the reflective layer and in contact with the reflective layer, wherein a main component of the reflective layer is Ag;

a main component of the dielectric layer is at least one selected from the group consisting of an oxide of Ta, nitride of Ta and a nitrooxide of Ta;

a thickness of the first interface layer is at least 1 nm and at most 10 nm;

the second interface layer includes at least one selected from the group consisting of carbon (C), a nitride of an element α (wherein α is at least one element selected from Sn, In, Zr, Si, Cr, Al, V, Nb, Mo, W, Ti, Mg and Ge), an oxide of clement α, a carbide of element α, and a nitrooxide of element α;

a sputtering gas comprising oxygen or oxygen and nitrogen is used in the formation step of the reflective layer having Ag as its main component;

the recording layer, the dielectric layer and the reflective layer are formed in this order on the substrate, and the recording medium being able to record and reproduce information with a laser light beam of 300 to 500 nm wavelength.

8. The method for manufacturing an optical information recording medium according to claim 7, wherein the oxygen concentration in the sputtering gas is at least 3 vol. % and at most 40 vol. %.

9. The method for manufacturing an optical information recording medium according to claim 7, wherein the first interface layer includes at least one selected from the group consisting of carbon (C), a nitride of an element α (wherein α is at least one element selected from Sn, In, Zr, Si, Cr, Al, V, Nb, Mo, W, Ti, Mg and Ge), an oxide of element α, a carbide of element α, and a nitrooxide of element α.

10. The method for manufacturing an optical information recording medium according to claim 7, wherein a thickness of the second interface layer is at least 1 nm and at most 10 nm.

11. The method for manufacturing an optical information recording medium according to claim 7, wherein the recording layer includes Sb and Te.

12. The optical information recording medium according to claim 7, wherein the dielectric layer further comprises at lest one selected from the group consisting of $SiO_2$, $Al_2O_3$, GeN, $Si_3N_4$, $Al_3N_4$, GeON, SiON, and AlON.

13. The optical information recording medium according to claim 7, further comprising a step of forming a protective film on an outer surface opposite from the substrate.

14. A recording/reproduction method for a phase-change optical information recording medium comprising, on a transparent substrate, a recording layer in which an optically detectable reversible change between an amorphous phase and a crystalline phase can be caused by irradiation with, an energy beam, a reflective layer, a dielectric layer arranged between the recording layer and the reflective layer, a first interface layer arranged between the recording layer and the dielectric layer, and a second interface layer arranged between the dielectric layer and the reflective layer and in contact with the reflective layer;

wherein the recording layer, the dielectric layer, and the reflective layer are formed in this order on the substrate;

a main component of the reflective layer is Ag;

a main component of the dielectric layer is at least one selected from the group consisting of an oxide of Ta, nitride of Ta and a nitrooxide of Ta;

the recording layer includes Sb and Te;

a thickness of the first interface layer is at least 1 nm and at most 10 nm; and the second interface layer includes at least one selected from the group consisting of carbon (C), a nitride of an element $\alpha$ (wherein $\alpha$ is at least one element selected from Sn, In, Zr, Si, Cr, Al, V, Nb, Mo, W, Ti, Mg and Ge), an oxide of element $\alpha$, a carbide of element $\alpha$, and a nitrooxide of element $\alpha$, the method comprising recording or reproducing information with a laser light beam of 300 to 500 nm wavelength.

15. The recording/reproduction method according to claim 14, wherein the reflective layer is formed by sputtering with a sputtering gas that comprises oxygen or oxygen and nitrogen.

* * * * *

UNITED STATES PATENT AND TRADEMARK OFFICE
CERTIFICATE OF CORRECTION

| | | |
|---|---|---|
| PATENT NO. | : 7,169,533 B2 | Page 1 of 1 |
| APPLICATION NO. | : 10/101430 | |
| DATED | : January 30, 2007 | |
| INVENTOR(S) | : Sakaue et al. | |

It is certified that error appears in the above-identified patent and that said Letters Patent is hereby corrected as shown below:

TITLE PAGE, ITEM (57) ABSTRACT: should read as follows:

--A phase-change optical information recording medium includes, on a transparent substrate, a recording layer in which an optically detectable reversible change between an amorphous phase and a crystalline phase can be caused by irradiation with an energy beam, a reflective layer, and a dielectric layer arranged between the recording layer and the dielectric layer. A main component of the reflective layer is Ag. A main component of the dielectric layer is at least one selected from the group consisting of an oxide of Ta, nitride of Ta and a nitrooxide of Ta. An interface layer may be provided between the recording layer and the dielectric layer. Thus, an optical information recording medium with superior corrosion resistance, improved signal amplitude and high reliability can be provided, as well as a method for manufacturing the same and a method for recording/ reproducing the same.--

TITLE PAGE, ITEM (56)
Page 2, second column, line 12: "96-34298" should read --97-34298--.
Page 2, second column, line 2 of Other Publications: "Translation of JP 2002-133918, partial" should read --Translation of JP 2002-133718, partial--.
Column 13, line 55(claim 1): "interface lager" should read --interface layer--.
Column 15, line 10(claim 12): "lest" should read --least--.
Column 15, line 19(claim 14): "with, an" should read --with an--.

Signed and Sealed this

Eighteenth Day of September, 2007

JON W. DUDAS
*Director of the United States Patent and Trademark Office*